Figure 1:
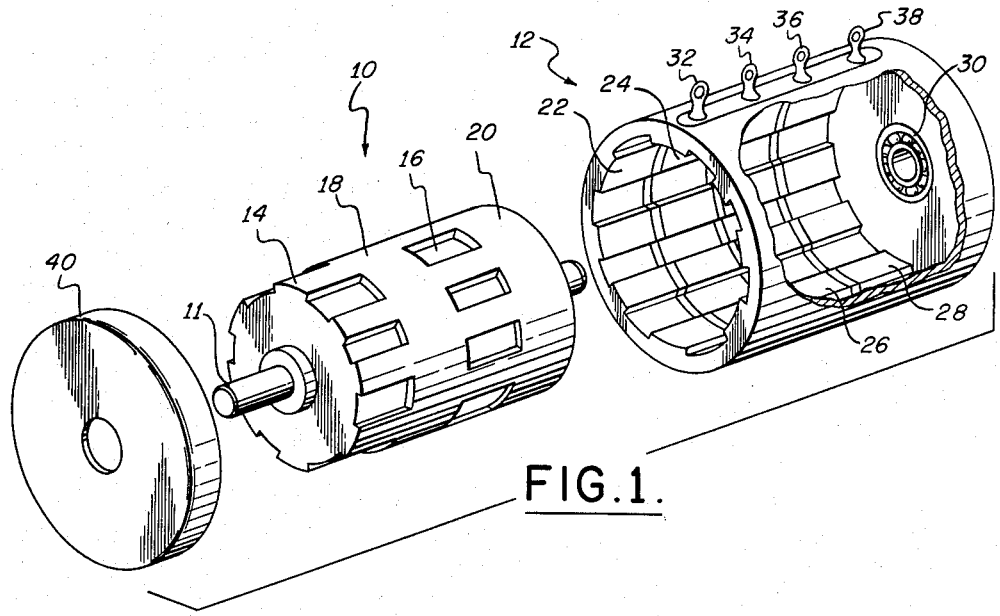

Sept. 1, 1964

H. B. DIAMOND 3,147,374

RESOLVER APPARATUS USING VARIABLE CAPACITORS COMPRISING TOOTHED ROTOR AND STATOR

Filed July 9, 1962

3 Sheets-Sheet 1

INVENTOR.
HERBERT B. DIAMOND
BY
S. C. Yeaton
ATTORNEY

Sept. 1, 1964 H. B. DIAMOND 3,147,374
RESOLVER APPARATUS USING VARIABLE CAPACITORS
COMPRISING TOOTHED ROTOR AND STATOR
Filed July 9, 1962 3 Sheets-Sheet 2

INVENTOR.
HERBERT B. DIAMOND
BY
S.C.Heaton
ATTORNEY

INVENTOR.
HERBERT B. DIAMOND
BY
ATTORNEY

United States Patent Office 3,147,374
Patented Sept. 1, 1964

3,147,374
RESOLVER APPARATUS USING VARIABLE CAPACITORS COMPRISING TOOTHED ROTOR AND STATOR
Herbert B. Diamond, Valley Stream, N.Y., assignor to Sperry Rand Corporation, Great Neck, N.Y., a corporation of Delaware
Filed July 9, 1962, Ser. No. 208,218
9 Claims. (Cl. 235—189)

This invention relates in general to modulators and in particular provides an electromechanical modulator which, depending on the manner in which it is excited, may be used in a multiplicity of ways, e.g. as an N-pole resolver, as a frequency differential device, etc. Basically, the instant apparatus consists of four capacitors, only two of which are variable (in a predetermined manner) and all four of which have a conductor electrically connected to one conductor of each other capacitor. In providing such circuit, only two active mechanical elements are employed, viz. a rotor and a stator.

More specifically: the rotor of the instant apparatus is electrically conductive and provided with two sets of N gear teeth and two smooth bands, such teeth sets being displaced circumferentially one half the width of a tooth from each other, i.e. the teeth sets are circumferentially displaced from each other one quarter of the way between the leading edges of successive lands. The stator is canister-shaped and provided with four sections, each electrically insulated from the others and, when the rotor is supported for rotation within the stator, the four sections of each element respectively axially align. The two stator sections axially corresponding to the two rotor sections with teeth must be provided with N teeth (although all four stator sections may be so formed), the two stator teeth sections being circumferentially aligned. Hence, when the rotor is rotated relative to the stator, two capacitances (between rotor and stator sections) respectively vary sinusoidally and cosinusoidally N times for each complete turn of the rotor, whereas two other capacitances remain invariant.

How the device may be excited to provide the above mentioned uses will be described in detail later.

A principal object of the invention is to provide an electromechanical modulator.

Another object of the invention is to provide a multipole capacitive type modulator.

Another object is to provide a multipole capacitive type resolver.

Another object is to provide apparatus that produces an electrical signal having a frequency equal to the difference between the frequencies of two applied signals.

Figure 2:
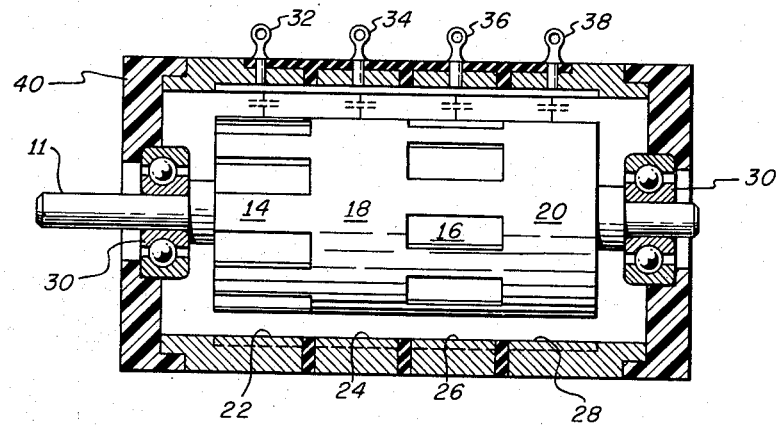
Figure 4:
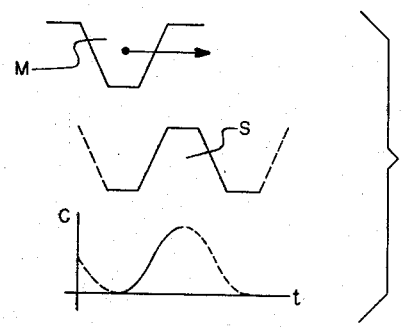
Figure 3A:
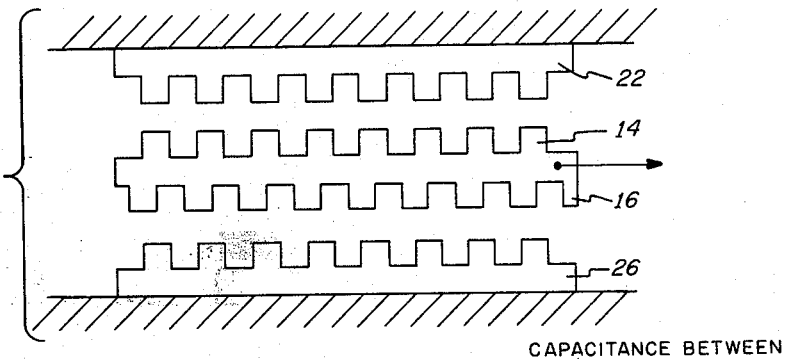
Figure 3B:
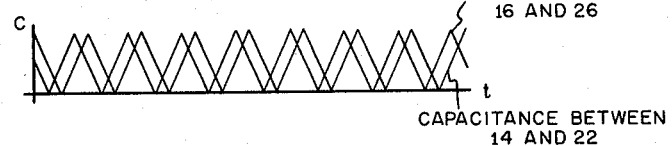
Figure 5:
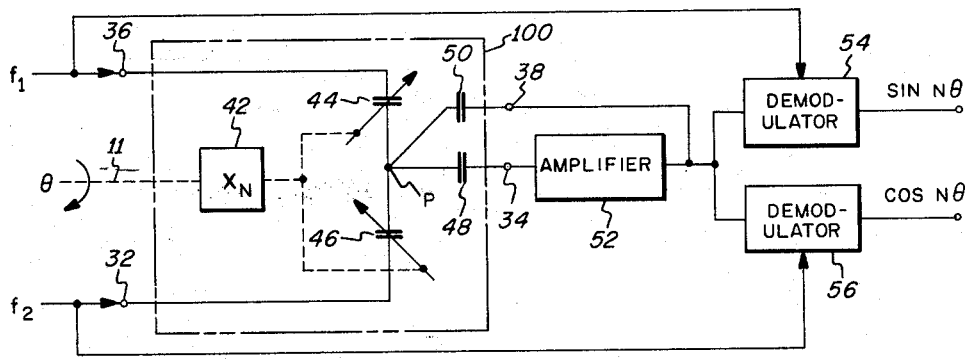
Figure 6:
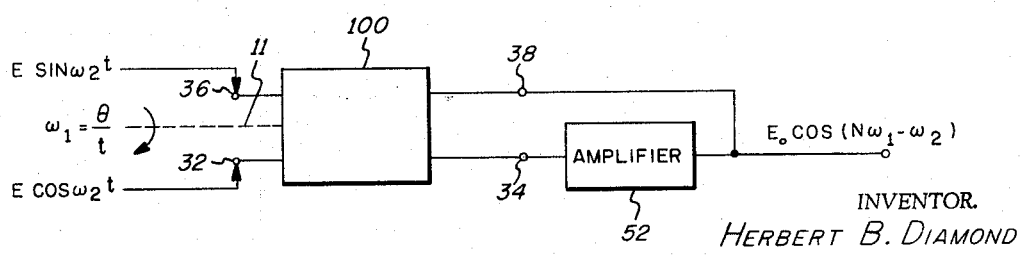
Figure 7A:
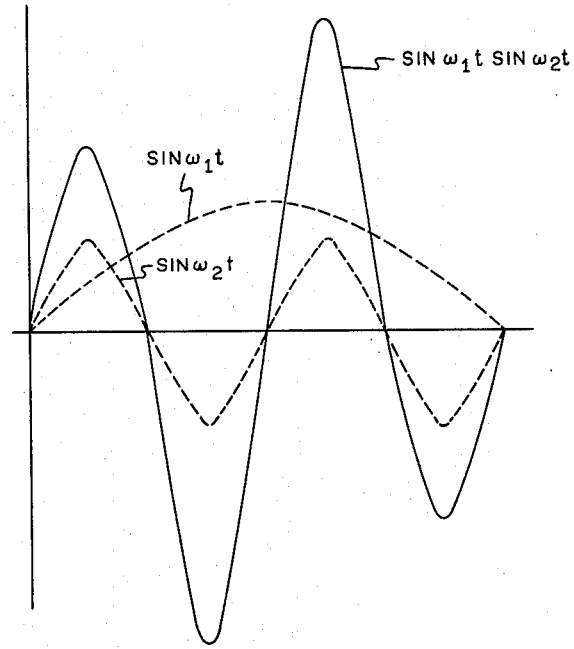
Figure 7B:
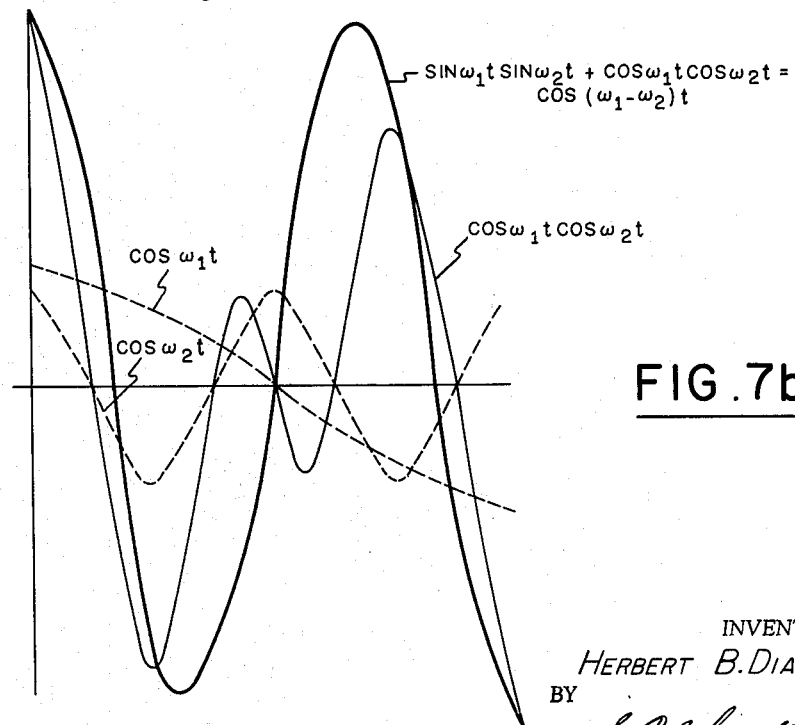

The invention will be described with reference to the figures wherein:

FIG. 1 is an exploded view of apparatus embodying the invention,

FIG. 2 is a side sectional view (which is partially schematic) of the apparatus depicted in FIG. 1, FIGS. 3a and 3b are diagrams useful in describing the multipole nature of the apparatus of FIG. 1, FIG. 4 is a diagram showing how modification of the rotor and stator teeth shapes changes the form of the outpupt electrical signal, FIG. 5 is a schematic diagram showing how the apparatus of FIG. 1 may be used in a resolver circuit, FIG. 6 is a block diagram showing how the apparatus of FIG. 1 may be employed as a frequency differential device, FIGS. 7a and 7b are diagrams useful in describing the operation of the circuit of FIG. 6.

Referring to FIGS. 1 and 2, a rotor 10 having an electrically insulated shaft 11 is adapted to be rotated within a stator 12. The rotor 10 is provided with four electrically connected conductive sections 14, 16, 18 and 20, only two of which (14, 16) are provided with gear teeth. The rotor gear teeth sections 14 and 16 are each provided with the same number of equisized teeth (in this case eight) and are so disposed that they are circumferentially displaced from each other by one quarter the arcuate distance between leading edges of successive teeth. The rotor sections 18 and 20 are not undulated in any way. The stator 12 is likewise provided with four electrically conductive sections 22, 24, 26 and 28, each being however electrically insulated from the others. The stator sections 22, 24, 26 and 28 are of such axial lengths that, when the rotor 10 is supported within the stator by its bearings 30, the rotor sections 14, 18, 16 and 20 axially align with respective stator sections 22, 24, 26 and 28 without overlapping, i.e. the rotor section 14 axially aligns with only the stator section 22, etc. The stator sections 22, 24, 26 and 28 have circumferentially aligned gear teeth of the same number and shape as the teeth of the rotor sections 14 and 16, and such stator sections are electrically connected to respective insulated terminals 32, 34, 36 and 38. The stator sections 24 and 28 may be smooth faced but, for ease of fabrication, all four stator sections are provided with teeth; a cover 40 is provided to support and enclose the rotor 10.

To see how the apparatus of FIGS. 1 and 2 operates to provide variable capacitances, reference should be had to FIG. 3a which shows the relatively positionable rotor and stator teeth sections (14 and 22, and 16 and 26) laid out on end so that their respective relative rotational movements are transformed into respective translational movements; for ease of description, such teeth sections are shown with (eight) rectangular teeth. By moving the teeth sections 14 and 16 to the right, the capacitance between the sections 14 and 22 cyclically changes in somewhat cosinusoidal manner (see FIG. 3b) each time a tooth on the section 14 departs from and approaches a tooth on the section 22; hence the capacitance between the sections 14 and 22 cyclically changes eight times each time any given tooth of the section 14 cyclically assumes a reference position. Similarly, the capacitance between the teeth sections 26 and 16 changes in somewhat sinusoidal manner (see FIG. 3b) as the sections 14 and 16 are moved to the right.

Because the relatively positionable teeth sections of FIG. 3a are rectangular, the variable capacitances provided thereby increase and decrease linearly, and abruptly change direction. To cause such capacitances to vary as desired, i.e. sinusoidally and cosinusoidally, the respective teeth sections are provided with tapered teeth. See FIG. 4. Now, as shown, when the FIG. 4 tooth M moves to the right with respect to the stationary tooth S, the capacitance between the two teeth increases and decreases in a generally sinusoidal manner.

Between the rotor section 18 and stator section 24, the capacitance is invariant; between the sections 20 and 28, the capacitance is likewise invariant.

Referring to FIG. 5, the apparatus of FIG. 1 (i.e. the schematic arrangement of elements contained within dashed lines 100) is shown excited for operation as a multipole resolver, the element 42 being a schematic representation of the multiplying properties of the teeth sections and the capacitors 44 and 46 arrows being directionally displaced with respect to each other to signify their sine-cosine variability. The capacitors 48 and 50 respectively represent the invariant capacitances mentioned above.

The terminals 36 and 32 are adapted to be electrically excited at different frequencies, i.e. at carrier frequencies $f_1$ and $f_2$ respectively, and the terminals 34 and 38 are connected to the input and output circuits of an amplifier 52; the amplifier output signal is applied simultaneously to two demodulators 54 and 56 (each of which may be like the demodulator shown and described in MIT Radiation Laboratories Series, vol. 19, page 514, Fig. 14.18, McGraw-Hill Book Co., New York), the demodulator 54 receiving as a "demodulation" signal the signal $f_1$ and the demodulator 56 receiving as a "demodulation" signal the signal $f_2$. The signals $f_1$ and $f_2$ must be different in frequency, but both must have frequencies within the bandpass of the amplifier 52.

With the signals $f_1$ and $f_2$ applied to the terminals 36 and 32 respectively, and with the shaft 11 set to some angle $\theta$, the capacitor 44 causes the signal $f_1$ to be varied (i.e. modulated) as a function of $\sin N\theta$ (where N is the number of teeth, i.e. the multiplier 42 factor), and the capacitor 46 causes the signal $f_2$ to be varied as a function of $\cos N\theta$. Hence, the resultant signal (ignoring distortion and feedback signal components to be described presently) on the rotor 10, i.e. the FIG. 5 summing point P, which is applied to the amplifier 52 via the "invariant" capacitor 48 is $f_1 \sin N\theta + f_2 \cos N\theta$, such resultant signal being applied simultaneously to the demodulators 54 and 56 also. By well-known demodulator action, the signal components $f_1$ and $f_2$ are cancelled, thereby producing the desired signals $\sin N\theta$ and $\cos N\theta$.

As referenced above, a distortion signal component appears on the rotor 10: this is caused by the fact that the capacitors 44 and 46 adversely influence each other's respective modulation, e.g. though the capacitor 46 acts to modulate the signal $f_2$ as a function of $\cos N\theta$ to produce $f_2 \cos N\theta$, such signal is again modulated as a function of $\sin N\theta$ by the action of the capacitor 44, thereby producing the distorted signal component $f_2 \sin N\theta \cos N\theta$. However, by means of the "invariant" feedback capacitor 50, the amplifier 52 output signal is fed back to its input circuit, thereby cancelling such distortion signal component in well-known manner.

The apparatus shown in FIGS. 1 and 2 may also be used as a frequency differential device, i.e. such apparatus may be used to produce a signal having a frequency equal to the difference between N times the rotational frequency $\omega_1$ of its shaft 11 and the frequency $\omega_2$ of an applied excitation signal. For example, by exciting the input terminals 36 and 32 (see FIG. 6) by quadrature components of the same signal frequency, i.e. $\sin \omega_2 t$ and $\cos \omega_2 t$, the modulation provided by the capacitors 44 and 46 (within the element 100) is such that the output signal from the amplifier 52 will be of a frequency equal to the difference between $N\omega_1$ and $\omega_2$. To appreciate how this can occur, reference should be had to FIGS. 7a and 7b. (For clarity of description, the multiplier N is considered hereafter to be equal to 1.) In FIG. 7a, the excitation signal $\sin \omega_2 t$ is shown modulated by the "capacitor 44" signal $\sin \omega_1 t$, the frequency $\omega_2$ being a multiple of the frequency 4 cycles per unit time and the frequency $\omega_1$ being the same multiple of the frequency 1 cycle per unit time. With the "$\omega_2$" signal so modulated, i.e. varied as a function of the "$\omega_1$" signal, a resultant signal $\sin \omega_1 t \sin \omega_2 t$ is produced. Similarly, the excitation signal $\cos \omega_2 t$ is modulated by the "capacitor 46" signal $\cos \omega_1 t$ (see FIG. 7b) to produce a resultant signal $\cos \omega_1 t \cos \omega_2 t$. By adding these two resultant signals, i.e. $\sin \omega_1 t \sin \omega_2 t + \cos \omega_1 t \cos \omega_2 t$, a signal is produced on the rotor 10 (i.e. at the FIG. 5 summing point P) having a frequency equal to the (same) multiple of three cycles per unit time, such frequency being the difference between the signal frequencies $\omega_1$ and $\omega_2$.

While the invention has been described in its preferred embodiments, it is to be understood that the words which have been used are words of description rather than of limitation and that changes within the purview of the appended claims may be made without departing from the true scope and spirit of the invention in its broader aspects.

What is claimed is:

1. Apparatus having two capacitors variable in quadrature relationship and a fixed capacitor, said fixed and variable capacitors all having one of their respective conductors connected together, comprising first and second means relatively rotatable about the same axis and each provided with three annular sections, said first means having two of its annular sections provided with the same quantity of equisized teeth and being circumferentially displaced one half the width of a tooth from each other, said second means having two of its annular sections each provided with said quantity of equisized teeth and being circumferentially aligned with respect to each other, said two teeth sections of one means being respectively axially aligned with the two teeth sections of the other means and the three sections of only one means being insulated from each other.

2. Apparatus that provides two input capacitors variable in quadrature relationship and an output capacitor, said capacitors each having one conductor electrically connected to one conductor of each of the other capacitors, comprising a stator member and a rotor member supported for rotation about the stator longitudinal axis, said stator member being provided with three electrically insulated conductive sections, two of said stator sections being each provided with N substantially equisized protuberances, said rotor member being provided with three electrically connected conductive sections two of which are provided with N substantially equisized protuberances apiece, each section of rotor protuberances being circumferentially displaced from the other by an angular distance substantially equivalent to one half the angular distance between both ends of any one protuberance, and said rotor member and stator members being so disposed that rotor sections with protuberances substantially axially align with stator sections with protuberances and at least one remaining section of either said rotor member or said stator member is provided with a smooth face.

3. A modulator comprising a stator having two conductive circumferentially aligned sections of N symmetrical teeth and two other conductive sections, said four sections being electrically insulated from each other and each being adapted to have applied thereto an electrical signal, and a rotor supported for relative rotation about the stator longitudinal axis and provided with four conductive sections all electrically connected together, two sections of said rotor having N symmetrical teeth axially aligned with respective teeth sections on the stator, said rotor teeth sections being circumferentially displaced with respect to each other by one half the width of a tooth, and the other sections of said stator and rotor being so disposed that at least one section of each pair of corresponding stator and rotor sections is substantially smooth surfaced, whereby two variable capacitances and two constant capacitances are provided, said variable capacitances being cyclically varied N times for each complete turn of said rotor.

4. Apparatus that provides two input capacitors variable in quadrature relationship and two fixed capacitors, said capacitors each having one conductor electrically connected to one conductor of each of the other capacitors, comprising a stator member and a rotor member supported for rotation about the stator longitudinal axis, said stator member being provided with four electrically insulated conductive sections, two of said stator sections being each provided with N substantially equisized protuberances, said rotor member being provided with four electrically connected conductive sections, two of which are provided with N substantially equisized protuberances apiece, each section of rotor protuberances being circumferentially displaced from the other by an angular distance substantially equivalent to one half the angular distance between both ends of any one protuberance and said rotor member and stator members being so disposed that rotor sections with protuberances substantially axially align with stator sections with protuberances and at least two remaining sections of either said rotor member or said stator member are provided with smooth faces.

5. A resolver comprising first, second, third and fourth capacitors each having one of its conductors electrically connected to a conductor of each other capacitor, means for varying the capacitances of said first and second capacitors sinusoidally and cosinusoidally respectively, said third and fourth capacitors having substantially constant capacitances, amplifier means the input of which is adapted to be connected to the free end of said third capacitor and the output of which is adapted to be connected to the free end of said fourth capacitor, first and second demodulators each adapted to receive the output signals from said amplifier means, and means adapted to apply a signal of one frequency to the free end of said first capacitor and said first demodulator and a signal of a different frequency to said second capacitor and said second demodulator, whereby the output signals from said first and second demodulators are representative respectively of the sine and cosine of the variation provided by said means for varying capacitances.

6. Resolver apparatus comprising modulator means comprising a stator having two conductive circumferentially aligned sections of N symmetrical teeth and two other conductive sections, said four sections being electrically insulated from each other and each being adapted to have applied thereto an electrical signal, and a rotor supported for relative rotation about the stator longitudinal axis and provided with four conductive sections all electrically connected together, two sections of said rotor having N symmetrical teeth axially aligned with respective teeth sections on the stator, said rotor teeth sections being circumferentially displaced with respect to each other by one half the width of a tooth, and the other sections of said stator and rotor being so disposed that at least one section of each pair of corresponding stator and rotor sections is substantially smooth surfaced, whereby two variable capacitances and two constant capacitances are provided, said variable capacitances being cyclically varied N times for each complete turn of said rotor, amplifier means the input and output of which are connected respectively to stator sections not disposed to provide variable capacitances, first and second demodulator means adapted to receive simultaneously the amplifier means output signals, means adapted to apply to said stator sections disposed to provide variable capacitances signals respectively of different frequencies, each of said signals being also applied to respective demodulator means, whereby the output signals from said demodulator means are respectively representative of the sine and cosine of N times the angle through which said rotor is turned from a neutral position.

7. Apparatus for providing a signal having a frequency equal to the difference between the frequencies of two applied signals comprising first, second, third and fourth capacitors each having one of its conductors electrically connected to a conductor of each other capacitor, means for varying the capacitances of said first and second capacitors sinusoidally and cosinusoidally respectively, said third and fourth capacitors having substantially constant capacitances, amplifier means the input of which is adapted to be connected to the free end of said third capacitor and the output of which is adapted to be connected to the free end of said fourth capacitor, means applying to said first capacitor a signal at a first frequency, said signal varying sinusoidally, means applying to said second capacitor a signal at said first frequency but varying cosinusoidally, whereby the output signal from said amplifier means has a frequency equal to the difference between said first frequency and the frequency at which said first and second capacitors are varied.

8. Apparatus for providing a signal having a frequency equal to the difference between the frequency of two applied signals comprising first, second and third capacitors each having one of its conductors electrically connected to a conductor of each other capacitor, means for varying the capacitances of said first and second capacitors sinusoidally and cosinusoidally respectively, said third capacitor having a substantially constant capacitance, amplifier means the input of which is adapted to be connected to the free end of said third capacitor, means applying to said first capacitor a signal at a first frequency, said signal varying sinusoidally, means applying to said second capacitor a signal at said first frequency but varying cosinusoidally, whereby the output signal from said amplifier means has a frequency equal to the difference between said first frequency and the frequency at which said first and second capacitors are varied.

9. Apparatus for providing a signal having a frequency equal to the difference between one signal frequency and a multiple of another signal frequency comprising a stator having two conductive circumferentially aligned sections of N symmetrical teeth and two other conductive sections, said four sections being electrically insulated from each other and each being adapted to have applied thereto an electrical signal, and a rotor supported for relative rotation about the stator longitudinal axis and provided with four conductive sections all electrically connected together, two sections of said rotor having N symmetrical teeth axially aligned with respective teeth sections on the stator, said rotor teeth sections being circumferentially displaced with respect to each other one half the width of a tooth, and the other sections of said stator and rotor being so disposed that at least one section of each pair of corresponding stator and rotor sections is substantially smooth surfaced, whereby two variable capacitances and two constant capacitances are provided, said variable capacitances being respectively varied sinusoidally and cosinusoidally N times for each complete turn of said rotor, amplifier means the input and output of which are connected respectively to stator sections not disposed to provide variable capacitances, means adapted to apply to said stator section disposed to provide a sinusoidally varying capacitance a signal that varies sinusoidally at a first frequency, means adapted to apply to said stator section adapted to provide a cosinusoidally varying capacitance a signal that varies cosinusoidally at said first frequency, whereby the output signal from said amplifier means is provided with a frequency equal to the difference between said first frequency and N times the frequency at which said rotor is rotated.

References Cited in the file of this patent

UNITED STATES PATENTS

| | | |
|---|---|---|
| 932,111 | Fressenden | Aug. 24, 1909 |
| 1,441,212 | Cardwell | Jan. 9, 1923 |
| 1,893,019 | Culver | Jan. 3, 1933 |
| 2,266,057 | Massolle | Dec. 16, 1941 |
| 2,611,964 | Buisson | Sept. 30, 1952 |
| 3,024,371 | Lefkowitz | Mar. 6, 1962 |
| 3,068,457 | Nevins | Dec. 11, 1962 |